March 31, 1964  J. T. LINGLE  3,127,551
ELECTRICAL SEMICONDUCTOR POWER SUPPLY APPARATUS
Filed Dec. 31, 1958  2 Sheets-Sheet 1

INVENTOR.
JOHN T. LINGLE
BY *Omund R. Dahle*
ATTORNEY

March 31, 1964 J. T. LINGLE 3,127,551
ELECTRICAL SEMICONDUCTOR POWER SUPPLY APPARATUS
Filed Dec. 31, 1958 2 Sheets-Sheet 2

INVENTOR.
JOHN T. LINGLE
BY
ATTORNEY

United States Patent Office 3,127,551
Patented Mar. 31, 1964

3,127,551
ELECTRICAL SEMICONDUCTOR POWER SUPPLY APPARATUS
John T. Lingle, St. Paul, Minn., assignor to Minneapolis-Honeywell Regulator Company, Minneapolis, Minn., a corporation of Delaware
Filed Dec. 31, 1958, Ser. No. 784,191
10 Claims. (Cl. 320—1)

The present invention is concerned with an improved power supply for a photographic flash unit and more particularly with an improved battery saving electronic circuit for efficiently converting the low voltage D.C. potential to a high voltage D.C. potential to charge the high voltage capacitor of the photographic flash unit.

As is known in the art, the electronic type photographic flash unit utilizes a gas filled flash tube which is capable of emitting a brilliant flash of light when a high voltage capacitor is discharged through the flash tube. These flash units are powered either from an A.C. or D.C. source. The A.C. type of flash unit is provided with an extension cord which connects with a source of alternating voltage, such as is available in a residence or a photographic studio. This alternating voltage is stepped up to a high A.C. voltage by means of a step up transformer and is then rectified to charge a capacitor, which capacitor is then selectively discharged through the flash tube to produce the flash of light.

The D.C. type electronic photoflash unit may take one of two forms. The first of these forms involves a heavy, expensive, high voltage battery, for example, a dry cell having a voltage of 450 volts. The high voltage battery charges the capacitor which is then selectively discharged through the flash tube. The second form of D.C. type electronic photographic unit utilizes a plurality of light weight, inexpensive, low voltage batteries, commonly called flash light batteries. These cells may be of the type especially adapted for photographic use or may be rechargeable type cells. With this type of unit, a vibrator is provided to convert the low D.C. voltage of the battery to a low voltage A.C. or pulsating D.C. The low voltage A.C. is applied to a step up transformer to produce a high A.C. voltage. This high A.C. voltage is then rectified and the high D.C. voltage charges the capacitor which is connected to the flash tube, the flash tube circuit being adapted to discharge the capacitor through the flash tube to produce a brilliant flash of light.

It will be readily appreciated that it is only the two above described D.C. type flash units which are adapted to be readily used in any situation. This is not true of the A.C. type units because the A.C. type units require an extension cord connecting the unit to a source of alternating voltage, thereby limiting the location in which the A.C. unit may be utilized.

Prior art D.C. electronic type photographic flash units of the second type, in which the power supply includes a low voltage battery source, a D.C. to A.C. converter, a step up transformer, a rectifier, and a capacitor to be charged, have had the undesirable feature of relatively short battery life. One of the requirements of a good electronic type photoflash unit is that it have a relatively fast recycle rate, or in other words, after the flash unit is fired, it is desirable to be able to recharge the capacitor rapidly. Rapid recharging of the capacitor results in a heavy current drain from the low voltage cells and requires a relatively heavy duty vibrator to interrupt the D.C. current. The standby power requirements to operate the vibrator are substantial and are continuous whether the capacitor is being charged or is fully charged. In normal photographic use the vibrator must operate until the flash tube is fired since it is not usually feasible to turn off the vibrator after the capacitor is charged and prior to the time the flash tube is fired.

In this invention there is provided an improved battery conserving power supply circuit for an electronic photographic flash unit for converting the low voltage D.C. to a high voltage D.C. This improved circuit comprises, in general terms, a semiconductor oscillatory type circuit for periodically interrupting the low voltage potential, voltage step up transducer means and rectifying means for converting the high voltage A.C. to a D.C. potential; the circuit being designed to charge the capacitor to a high D.C. potential, for example, 500 volts, the components of the oscillatory type circuit being chosen so that the oscillation magnitude decreases and finally ceases upon the capacitor receiving the desired voltage charge. The circuit further includes a relaxation oscillator type circuit, actuated upon a predetermined drop in capacitor voltage, which is effective to restart the semiconductor oscillatory circuit. By this arrangement, the D.C. to A.C. converter operates merely long enough to charge the capacitor and then is rendered inoperative. In this manner a minimum amount of energy is extracted from the low voltage batteries and battery life is greatly extended.

Although the improved power supply circuit is particularly adapted for use in photographic flash units, the invention is not intended to be limited to use in the photographic field.

Referring now to the drawing, wherein like parts are indicated with like reference numerals throughout the figures.

Figure 1:
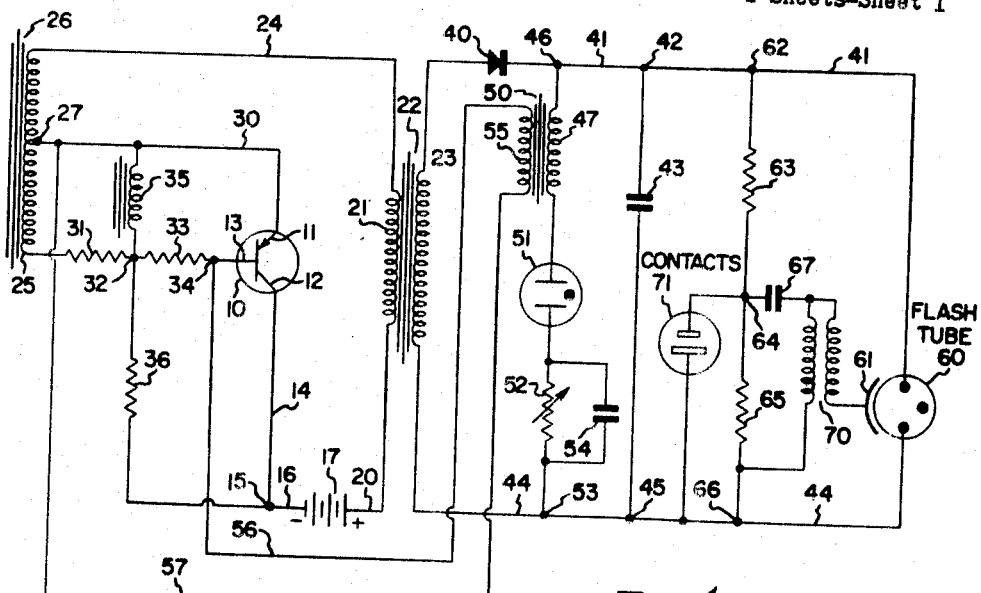
FIGURE 1 is a schemattic representation of an embodiment of my invention.

Referring to FIGURE 1, there is disclosed a semiconductor current controlling device 10, here disclosed as a transistor, which has an emitter electrode 11, a collector electrode 12 and a base electrode 13. The collector electrode 12 is connected by a conductor 14, a junction 15, and a conductor 16 to the negative terminal of a source of potential 17, here shown as a battery. The positive terminal of the source 17 is connected by a conductor 20 to the lower extremity of a primary winding 21 of an output transformer 22. The output transformer 22 also includes a secondary winding 23. The upper extremity of the winding 21 is connected by a conductor 24 to the upper extremity of a winding 25 of a saturable coil or transformer 26. An intermediate tap 27 on the winding 25 is connected by a conductor 30 to the emitter electrode 11 of transistor 10, and the lower extremity of the winding 25 is connected by means of a resistor 31, a junction 32, a resistor 33, and a junction 34 to the base electrode 13. An inductive coil 35 is connected between the junction 32 and the conductor 30.

The upper extremity of secondary winding 23 of the output of transformer 22 is connected through a rectifying diode 40, a conductor 41, and a junction 42 to the upper plate of a main capacitor 43, which may be in the order of a 400 microfarad, 500 volt rating. The lower extremity of the secondary winding 23 is connected by means of a conductor 44 and a junction 45 to the lower plate of the main capacitor 43.

A relaxation oscillatory type circuit is connected in parallel with the main capacitor 43. This circuit may be traced from a junction 46 on the conductor 41 through a primary winding 47 of a transformer 50, through a bi-stable voltage reference device 51 such as a neon tube type NE1, often referred to as a glow tube and through a variable resistance 52 to a junction 53 on a conductor 44. A capacitor 54 is in parallel with the resistance 52. The transformer 50 also includes a secondary winding 55 the upper terminal of which is connected by a conductor 55 to the base electrode 13 of transistor 10 at the junction 34, and the lower terminal of which is connected by a conductor 57 to the tap 27 and thus to the emitter electrode 11.

A high voltage photographic flash tube 60 is a gas filled device provided with a pair of main current conducting electrodes the upper one of which is connected through the conductor 41 through the upper plate of main capacitor 43, and the lower of which is connected by the conductor 44 to the lower plate of the main capacitor 43. The flash tube 60 also includes a triggering electrode 61 which is adapted to initiate discharge of the flash tube, as will be described.

A voltage divider network is also connected across the main capacitor 43, and a circuit may be traced from the upper plate of the capacitor 43 through the junction 42, a portion of the conductor 41, a junction 62, a resistor 63, a junction 64, a resistance 65, a junction 66 on the conductor 44, and from the junction 45 on the conductor 44 to the lower plate of the capacitor 43. A circuit which parallels the resistance 65 may be traced from the junction 64 through a triggering capacitor 67, and a first portion of the winding of the trigger coil or transformer 70 to the junction 66. The other portion of the triggering coil or transformer 70 is connected to the triggering electrode 61 of the flash tube 60. Also in parallel with the resistance 65 is a pair of normally open triggering contacts 71. The triggering contacts may be connected to or may represent the camera shutter contacts. These components form the triggering circuit for igniting the flash tube and discharging the capacitor 43 through the tube to produce the flash of light.

*Operation of FIGURE 1*

The circuit of FIGURE 1 discloses a low voltage D.C. source 17, and electronic converter comprising the transistor 10 and transformers 26 and 22 for converting the low voltage D.C. to a high voltage A.C. which is rectified and charges the main capacitor 43 to a high D.C. voltage. The electronic inverter is designed so that upon the capacitor 43 charge approaching a predetermined potential, the inverter oscillation will diminish and cease. A relaxation oscillator circuit, designed to measure voltage decay from the predetermined potential on the main capacitor, provides current pulses into the electronic inverter to restart oscillations therein when the capacitor voltage has decreased due to leakage or the like. The photographic flash tube 60 is directly connected across the main capacitor 43, and upon being triggered, the flash tube ignites and the capacitor is discharged through the flash tube to produce the flash of light.

Considering now the operation in greater detail, in the electronic oscillator inverter circuit a current path may be traced from the positive terminal of the low voltage battery source 17 through the primary winding 21 of the output transformer 22, through the upper portion of the winding 25 to the intermediate tap 27 of saturable transformer 26, through the transistor bias circuit from emitter 11 to base 13, and through resistors 33 and 36 to the negative terminal of battery source 17. A current path may also be traced through the output terminals of the transistor 10 from emitter 11 to collector 12 and through the conductors 14 and 16 to the negative terminal of the source 17. The initiation of current flow through the transistor causes a potential drop to appear across the winding 25 which provides additional bias to the transistor 10 to enter it fully conductive and allow heavy current flow through the circuit including the output transformer.

This state of operation continues until the core of transformer 26 saturates, and upon saturation the potential previously induced on the lower portion of the winding 25 disappears and the transistor 10 turns off until the core is reset. During the period the transistor 10 was conductive, a current path could also be traced through the inductance 35. At the time the transformer saturates and the transistor cuts off, the energy stored in the inductance 35 causes a current to flow through the winding 25 in a direction to reset the flux level of the core of transformer 26. Following the core reset, the transistor 10 is no longer back biased between the emitter 11 and base 13, and base bias current flowing through the resistors 33 and 36 again initiates conduction in the transistor and the cycle repeats. This oscillating cycle causes an interrupted or chopped D.C. current to flow in the primary winding 21 of transformer 22 and this pulsating D.C. is transformed to a high voltage A.C. by the step up transformer.

During the period the transistor 10 is conductive and current is flowing in the primary winding 21 of the output transformer 22, a high voltage potential is induced in the secondary winding 23 which causes a current to flow through the rectifier 40 and which is impressed across the main capacitor 43 tending to charge the capacitor. This current path may be traced from the upper terminal of winding 23 through the rectifier 40, conductor 41, junction 42, capacitor 43, junction 45, and back through the conductor 44 to the lower terminal of the winding 23.

During the initial stages of charging the capaictor 43, the charging current is relatively high and the impedance reflected back into the primary winding 21 is relatively low so that a large current flows through the winding 21, the winding 25 and the transistor 10. Since the bias developed across the lower portion of winding 25 is proportional to the current flowing in the low voltage circuit, it is apparent that a large potential regenerative current feedback is developed during this initial period. As the charging of the main capacitor 43 continues towards the peak voltage of which the circuit is designed, the charging current flowing in the low voltage circuit is reduced. The reduced current flow is accompanied by a reduction in the bias potential induced on the lower portion of winding 25, and as the capacitor 43 becomes fully charged, the design of the oscillator circuit is such that the loop gain of the oscillator is reduced below unity and oscillation ceases.

As has been previously mentioned, the circuit is specifically designed, such that after rapidly charging the main capacitor 43, the electronic oscillator converter ceases oscillation so that the useable life of the low voltage batteries can be extended. Since the voltage on the main capacitor 43 will decay due to capacitor leakage, the shunt impedance and the like, even though the flash tube is not fired, a pulsing circuit is provided which is sensitive to a predetermined decay in the capacitor voltage to reinitiate oscillation of the electronic converter. Thus, for example, if the main capacitor is normally charged to 500 volts whereupon oscillation ceases, it may be desirable to restart the oscillator when the voltage on the capacitor 43 has dropped to no lower than 450 volts.

A circuit may be traced from the upper plate of capacitor 43 through the conductor 41 to junction 46, through the winding 47 of transformer 50, through the neon glow tube 51, resistor 52 to junction 53 and back through the conductor 44 to the lower plate of capacitor 43. With the main capacitor charged to its maximum value, a minute but continuous current flows through the circuit above described, a variable resistor 52 being set to allow sufficient current to flow through the glow tube to maintain conduction. This current flow through the resistor 52 results in a voltage charge appearing on the parallel capacitor 54. Consider now the operation of the above circuit when the voltage on capacitor 43 has decayed by a predetermined amount. The value of resistor 52 is chosen such that when the capacitor voltage decays to 450 volts, for example, the current flowing through the glow tube falls below that required to maintain the gas ionized, and current flow through the glow tube ceases. The potential on capacitor 54 now discharges through the resistance 52, and as this voltage decreases the potential appearing across the electrodes of the glow tube is increased to the firing potential of the glow tube. The glow tube again fires and current flows through the primary winding 47 and the capacitor 54, this current flow continuing until a steady-state condition is reached with regard to the charge on capacitor 54 thereupon the glow tube is again extinguished.

When the glow tube 51 fires and current flow is initiated through the transformer 50 the induced potential in the secondary winding 55 is applied across the emitter base electrodes of the transistor 10 in a polarity direction to initiate current conduction in the transistor. Since the glow tube 51, the transformer 50 and the resistor 52-capacitor 54 circuit forms a relaxation type oscillator, a continuing train of pulses will be applied to the input terminals of the transistor in the event that oscillation is not initiated immediately. It will be appreciated that the starting kick for the transistor 10 can be applied from the transformer 50 either on firing or extinction of the glow tube 51, depending upon the polarity connection of the secondary winding 55. Upon being restarted the oscillator converter circuit runs until the capacitor 43 is again charged to full voltage.

As the main capacitor 43 is charged, a current flows through the voltage divider comprising the resistors 63 and 65 which causes a charge to appear on the triggering capacitor 67. The charging current of capacitor 67 flowing through the first portion of the winding of triggering coil 70 is not of a nature to cause a triggering potential to appear at the triggering electrode 61 of the flash tube.

When it is desired to flash the flash tube 60, the camera shutter circuit is completed by completing a circuit between the contacts 71. This circuit shunts the capacitor 67 and causes the capacitor 67 to discharge through a portion of the triggering coil 70. A high triggering potential is induced in the second portion of the winding of the triggering coil which is connected to the triggering electrode 61 of the flash tube. This high potential causes the gas particles to ionize and allows the main capacitor 43 to discharge through the flash tube 60 to produce the flash of light.

Figure 2:
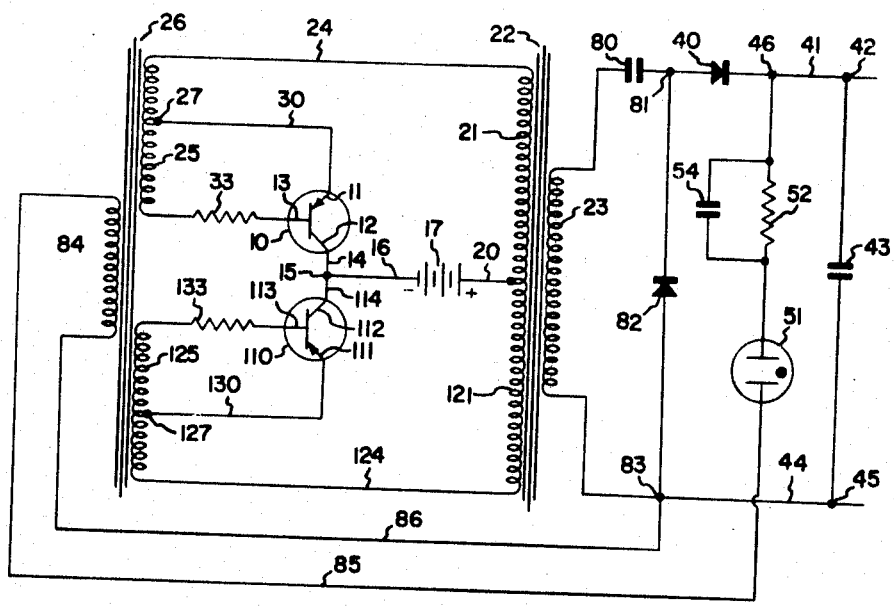
FIGURES 2 and 3 are modifications of FIGURE 1.

Operation of FIGURE 2

The circuit of FIGURE 2 which is a modification of FIGURE 1 is in many respects similar to FIGURE 1 and like components have been identified with like numerals. The oscillator converter of FIGURE 2 comprises a double ended oscillator circuit which includes a pair of semiconductor amplifying devices 10 and 110. The device 110 has an emitter electrode 111, a collector electrode 112 and a base electrode 113. The saturating transformer 26 has in addition to the winding 25 a further winding 125, and the base electrode 113 is connected to the upper terminal of the winding 125. The emitter electrode 111 is connected through a conductor 130 to an intermediate tap 127 on the winding 125 and the lower extremity of the winding is connected by a conductor 124 to the lower extremity of the primary winding 121 on the output transformer 22. The windings 21 and 121 form a center tapped primary winding energized from the positive terminal of the source 17.

In the high voltage secondary circuit the upper terminal of the winding 23 is connected through a capacitor 80 and a junction 81 to the rectifying diode 40. A further rectifying diode 82 is connected between the junction 81 and a junction 83 on the conductor 44. The rectifiers 82 and 40, the capacitor 80 and the winding 23 form a conventional voltage doubler circuit which provides a rectified D.C. potential for charging the main capacitor 43.

In the circuit of FIGURE 1, as previously described, the relaxation oscillator circuit for restarting the converter was coupled by means of a separate transformer 50 to the emitter base electrodes of the transistor. In FIGURE 2, however, an additional winding 84 on the saturating transformer 26 is utilized to provide the coupling. A circuit may be traced from the junction 46 on the conductor 41 through the resistor 52 and paralleled capacitor 54, through the glow tube 51, a conductor 85 to the upper terminal of the winding 84 and from the lower terminal of the winding 84 through a conductor 86 to the junction 83 on the conductor 44.

In considering the operation of FIGURE 2, it is to be understood that the transistors 10 and 110 conduct alternately. Assuming transistor 10 is in the conductive state a current path may be traced from the positive terminal of source 17 through conductor 20, winding 21, conductor 24, the upper portion of winding 25, conductor 30, emitter to collector of transistor 10, and conductors 14 and 16 to a negative terminal of the source. The base bias current flowing in the lower section of winding 25, which is the regenerative current feedback causing oscillation, must be designed to be of sufficient magnitude to maintain the transistor in the conductive state. This bias current is proportional to the difference between the current flowing in the upper portion of winding 25 and the magnetization current requirements of the transformer 26. The transistor 10 continues to conduct until the core of transformer 26 saturates whereupon the magnetization demand of the transformer increases thereby reducing the current available for the base bias current and the transistor is rendered non-conductive. The flux in the core of transformer tends to collapse inducing a voltage in the winding 125 of a polarity to render the transistor 110 conductive.

With transistor 110 in the conductive state a current path may be traced from the positive terminal of source 17 through the conductor 20, winding 121, conductor 124, the lower portion of winding 125, the conductor 130, emitter to collector of transistor 110, and conductors 114 and 16 to the negative terminal of the source 17. Transistor 110 remains in the conductive state until the core of transformer 26 saturates in the opposite direction whereupon the cycle repeats.

From the above discussion it can be seen that the alternate conduction of transistors 10 and 110 results in an alternating flux being induced in the core of output transformer 42 and thus a high voltage A.C. potential in the secondary winding 23. During the half cycle in which the lower terminal of winding 23 is positive a current path may be traced from the lower terminal of winding 23 to junction 83, through rectifier 82, junction 81, and through capacitor 80 to the upper terminal of winding 23 whereupon the capacitor 80 becomes charged. On the succeeding half cycle a current path may be traced from the upper terminal of winding 23, capacitor 80, through the rectifying diode 40, conductor 41, junction 42, through main capacitor 43, and back through the conductor 44 to the lower terminal of winding 23. As oscillation continues and the capacitor 43 becomes more fully charged, the charging current reduces and therefore there is less current flowing in the primary windings 21 and 121. Since the magnetization requirements of the transformer 26 are substantially constant until the core saturates, it can be seen that with the reduced current flowing there will be less regenerative feedback current available for the base bias. Thus the decreased load current requirements cause a decreased base drive current so that the transistors conduct less. The circuit is designed such that when the capacitor 43 becomes charged to a predetermined level, the oscillation ceases.

The relaxation circuit operates substantially as before, upon the voltage charge on the main capacitor decreasing to a predetermined value, the glow tube 51 alternately conducts and extinguishes causing pulses of current to flow in winding 84 of the transformer 26 which has the effect of inducing a voltage into one of the windings either 25 or 125 such that one of the corresponding transistors is rendered conductive to reinitiate oscillation.

Figure 3:
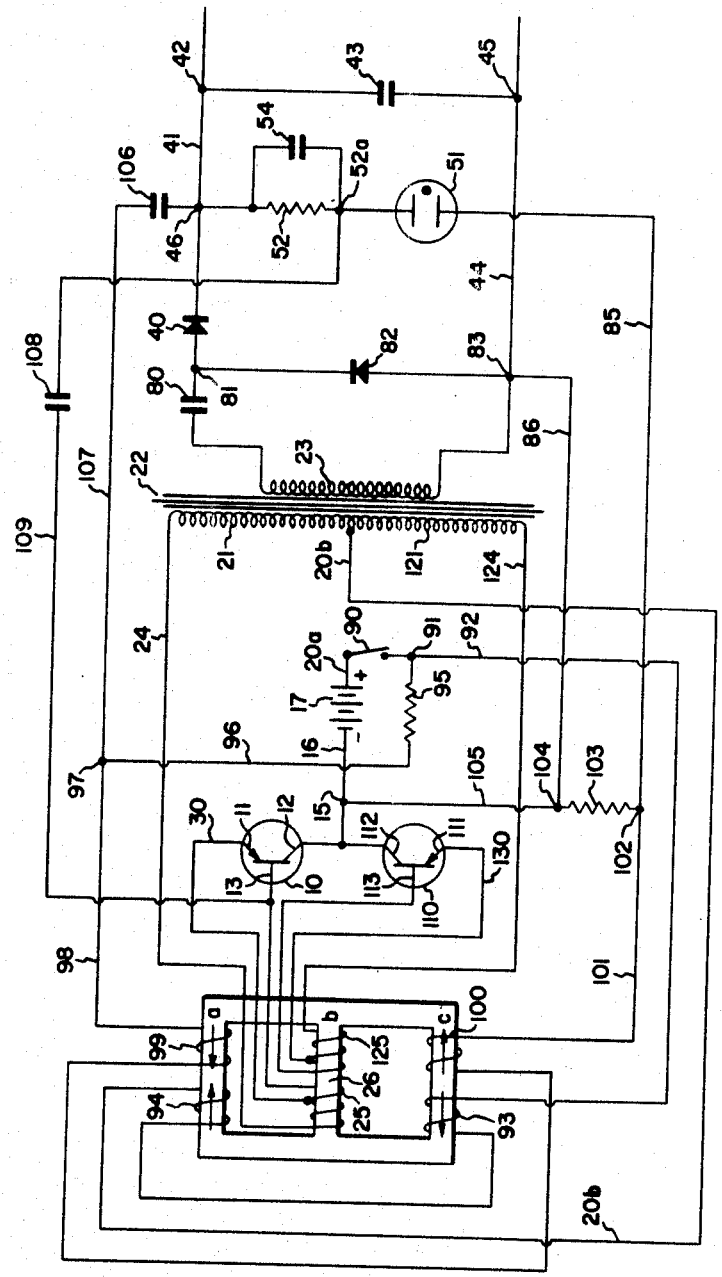

Operation of FIGURE 3

The circuit of FIGURE 3 is a modification of FIGURE 2 and in many respects similar thereto. Only the points of difference will be discussed hereafter. The transformer 26 of FIGURE 3 is disclosed as having a three legged core. The core legs are denoted as *a*, *b*, and *c* with the core leg *b* representing the central leg upon which the windings 25 and 125 are wound. Core leg *a* has a pair of windings 94 and 99 thereon and the core leg *c* has a pair of windings 93 and 100 thereon. A current path may be traced from the positive terminal of the source 17 through a conductor 20*a*, a switch 90, a junction 91, a conductor 92, through the winding 93 on core leg *c* and the winding 94 on core leg *a* and through a conductor 20*b* to the center tap of the primary winding of transformer 22. Thus it is apparent that the current flowing through the windings 93 and 94 is equal to the load current.

Another current path may be traced from the positive terminal of the source 17 through the conductor 20*a*, the switch 90, the junction 91, a resistor 95, a conductor 96, a junction 97, a conductor 98, through the winding 99 on core leg *a* and then through the winding 100 on core leg *c*, through a conductor 101, a junction 102, a resistor 103, a junction 104, a conductor 105, the junction 15 and through the conductor 16 to the negative terminal of the source. It will be appreciated that the second current path described provides a relatively constant bias current flowing through the windings 99 and 100 which is limited primarily by the value of the resistances 95 and 103.

In FIGURE 3, the conductor 86 connects the conductor 44 of the output circuit to the junction 104 and thus to the negative terminal of the source 17. The junction 46 on the conductor 41 is connected by means of the resistor 52, the glow tube 51 and the conductor 85 to the junction 102. The junction 46 is also connected by means of a capacitor 106 and a conductor 107 to the junction 97. From a junction 52*a* between resistor 52 and glow tube 51 a signal path can be traced through a capacitor 108 and a conductor 109 to the control electrode 13 of transistor 10.

In considering the operation of the oscillator converter of FIGURE 3, it will be noted that the low voltage load current flows through the windings 93 and 94 which are located on core leg *c* and *a*, respectively. The windings 93 and 94 are arranged such that the flux induced in core legs *c* and *a* cancel in the core leg *b* and therefore produce no net effect on core leg *b*. It will further be noted that the bias windings 99 and 100 which are energized from the source 17 produce a flux in core legs *a* and *c* which opposes the flux induced by windings 94 and 93. These circuits are designed so that under initial charging conditions of the main capacitor 43, when the load current of the oscillator inverter is relatively large, the flux induced due to the current flow through winding 94 is nearly equal and opposite to the flux induced by the current flow through winding 99. Likewise the flux induced due to currents flowing through windings 93 and 100 are nearly equal and opposite. Under these conditions the oscillator converter operates substantially the same as explained for the circuit of FIGURE 2.

As the voltage charge on the main capacitor 43 becomes large and the output current flowing in windings 21 and 121 declines, the current through the windings 93 and 94 of the saturable transformer are likewise reduced since they are in series with the low voltage converter circuit. With the current through the windings 93 and 94 reduced, the flux induced in core legs *c* and *a* (by windings 93 and 94) is likewise reduced and a point is reached at which the bias current flowing in windings 99 and 100 causes the core legs *a* and *c* to saturate whereupon the loop gain of oscillator is reduced below unity and oscillation ceases.

With the oscillator stopped, the voltage charge on capacitor 43 gradually decays and the relaxation oscillator consisting of resistor 52, capacitor 54 and the glow tube 51 becomes operative. When the glow tube 51 fires, a pulse of current is fed through the conductors 85 and 101 to the windings 100 and 99 which overrides the steady-state D.C. bias current in these windings, thus taking the core legs *a* and *c* out of saturation.

At the same instant a negative going pulse is sent through capacitor 108 to the control electrode 13 of transistor 10. The transistor 10 is thus caused to conduct and the resulting load current through windings 93 and 94 further aids the resetting of the flux in the core. Oscillation again continues until the charge on capacitor 43 approaches its maximum whereupon the charging current again declines, oscillation ceases and the cycle is repeated.

When the storage capacitor 43 is discharged by firing the flash tube 60, the capacitor 106 will discharge through windings 99 and 100 bringing the core out of saturation and this signal combined with a pulse from capacitor 108 to the control electrode 13 causes the oscillator to commence operating again to recharge capacitor 43.

Many changes and modifications of this invention will undoubtedly occur to those skilled in the art, and I therefore wish it to be understood that I intend to be limited by the scope of the appended claims and not by the specific embodiments of my invention which are disclosed herein for the purpose of illustration.

I claim:
1. Energy conserving power supply apparatus for an electronic photographic flash unit of the type for converting a low voltage battery source to a high voltage for rapidly charging photoflash capacitor means to a predetermined voltage comprising: a low voltage battery source; semiconductor oscillator means energized from said low voltage source, said oscillator means having output terminals for providing a high voltage alternating output; connecting means including rectifying means connecting the alternating output of said semiconductor oscillator means to said capacitor means to provide rapid charging of said capacitor means therefrom; feedback circuit means in said semiconductor oscillator means responsive to the quantity of charge on said capacitor means to stop the oscillation of said oscillator means upon said capacitor means voltage reaching said predetermined voltage; and oscillator restarting signal producing means connected to and energized from said capacitor means, said signal producing means being responsive to a predetermined decay in voltage on said capacitor means from said predetermined voltage to thereafter automatically provide starting current pulses to said semiconductor oscillator means to reinitiate oscillation therein, so that upon said photoflash capacitor means being rapidly charged to said predetermined voltage said oscillator means is thereafter operated intermittently as required to maintain said capacitor means voltage at or near said predetermined value thereby conserving energy in said battery source.

2. Battery conserving power supply apparatus of the type for converting a low voltage source to a high voltage for charging capacitor storage means to a predetermined high voltage, comprising: a low voltage battery source; output means including rectifying means; inverter means comprising semiconductor amplifying means having input and output terminals, said input terminals having a regenerative current feedback loop connected in circuit therewith, said feedback loop being connected to said inverter means output terminals and providing a current proportional to inverter output current; circuit means connecting said source, said output means and said inverter means terminals in an oscillating type circuit for converting said battery source to a high voltage; further circuit means connecting said output means to said capacitor storage means in charging relation thereto, said capacitor storage means reflecting to said inverter output terminals an increasing impedance as said capacitor storage means is charged; said current feedback loop of said inverter means being designed such that upon the voltage charge on said capacitor storage means reaching said predetermined value the feedback current is reduced sufficiently that oscillation ceases; and pulse producing means energized by a decrease in said capacitor storage means voltage from said predetermined value and connected to the input terminals of said inverter means to thereupon provide signal pulses to the input terminals of said inverter means to reinitiate oscillation therein.

3. Energy conserving power supply apparatus of the type for converting a low voltage source to a high voltage for charging capacitor storage means to a predetermined high voltage, comprising: normally operative semiconductor oscillator means, energized from a low voltage source, said means comprising semiconductor current controlling means having input terminals, said input terminals having a current feedback loop connected in circuit therewith; output means including rectifying means connecting the high voltage alternating output of said semiconductor oscillator means to said capacitor storage means in charging relation thereto; the semiconductor oscillator means, current feedback loop, capacitor storage means, and output means being designed such that feedback decreases as the capacitor is charged whereupon the normally operative semiconductor oscillator means is rendered inoperative upon the voltage charge on said capacitor storage means reaching said predetermined value; and voltage responsive signal producing means connected to said capacitor storage means and responsive to a decay in voltage from said predetermined value to thereupon provide a starting current pulse to the input terminals of said semiconductor oscillator means to restart oscillation therein.

4. Energy conserving power supply apparatus of the type for converting a low voltage source to a high voltage for charging capacitive storage means comprising: semiconductor oscillator means energized from the low voltage source, said oscillator means providing a high voltage alternating output; means including rectifying means connecting the alternating output of said semiconductor oscillator means to said capacitive storage means; circuit means in said semiconductor oscillator means responsive to the state of charge on said capacitive storage means to render said oscillator means inoperative upon said capacitive storage means voltage reaching a predetermined value; and voltage responsive signal producing means for sensing a decrease in voltage on said capacitive storage means from said predetermined voltage to thereupon provide starting current pulses to said semiconductor oscillator means to render the same operative.

5. Energy conserving power supply apparatus of the type for converting a low voltage source to a high voltage for charging capacitor storage means, comprising: semiconductor oscillator means energized from a low voltage source comprising semiconductor current controlling means having input terminals, said input terminals having a current feedback loop connected in circuit therewith; output means including rectifying means connecting the high voltage alternating output of said semi-conductor oscillator means to said capacitor storage means in charging relation thereto; said capacitor storage means, said output means and said current feedback loop being designed such that the normally operative semiconductor oscillator means is rendered inoperative upon the voltage charge on said capacitor storage means reaching a predetermined value; and voltage responsive signal producing means connected to said capacitor storage means and responsive to a decay in voltage from said predetermined value to thereupon provide a starting current pulse to said semiconductor oscillator means to render the same operative.

6. Energy conserving power supply apparatus of the type for converting a low voltage battery source to a high voltage for charging capacitor storage means comprising: semiconductor oscillator means energized from the low voltage battery source, said oscillator means having voltage step up output transformer means for providing a high voltage alternating output; means comprising rectifying means connecting the high voltage alternating output of said semiconductor oscillator means to said capacitor storage means; circuit means including feedback transformer means in said semiconductor oscillator means responsive to the output current from said oscillator means and effective to render said oscillator means inoperative upon said capacitor storage means voltage reaching a predetermined value; and signal producing means responsive to a decay in voltage on said capacitor storage means from said predetermined value to thereafter provide starting current pulses to the feedback transformer means of said semiconductor oscillator means to render the same again operative.

7. Energy conserving power supply apparatus of the type for converting a low voltage source to a high voltage for the charging capacitor storage means to a predetermined high voltage, comprising: normally operative semiconductor oscillator means energized from a low voltage source comprising semiconductor current controlling means, output means including rectifying means connecting the high voltage alternating output of said semiconductor oscillator means to said capacitor storage means in charging relation thereto; current responsive feedback means in said oscillator means, said feedback means comprising feedback transformer means having a plurality of windings including first winding means connected to carry a current proportional to the oscillator means load current, second and third winding means on a saturable portion of the transformer core, said second winding means being energized by a substantially constant current, said third winding means opposing said second winding means and being energized as a function of the oscillator means load current, the semiconductor oscillator means, current feedback means, capacitor storage means and output means being designed such that feedback decreases as the capacitor storage means is charged whereupon the second winding means predominates saturating said saturable core portion so that the normally operative semiconductor oscillator means is rendered inoperative upon the voltage charge on said capacitor storage means reaching a predetermined value; and voltage responsive signal producing means connected to said capacitor storage means and responsive to a decay in voltage from said predetermined value to thereupon provide a starting current pulse to said semiconductor oscillator means to render the same again operative.

8. Automatic turn-off turn-on energy conserving power supply apparatus for rapidly charging and maintaining a capacitor at a high voltage from a low voltage battery source, comprising: a low voltage battery source; a capacitor to be charged to a high voltage therefrom; inverter means comprising semiconductor amplifying means having input and output terminals, an output transformer having a primary and an output winding, a feedback transformer having a primary and an output winding, first circuit means connecting in a series circuit said source, said output transformer primary winding, said feedback transformer primary winding and said semiconductor means output terminals, and a regenerative feedback loop connecting the output winding of said feedback transformer to said semiconductor means input terminals to provide an oscillating circuit, said feedback loop being designed such that as the voltage charge on said capacitor approaches a predetermined value the feedback progressively decreases and oscillation ceases whereupon current drain on said low voltage source is substantially eliminated; and pulse producing means energized by a decrease in said capacitor voltage below said predetermined value to then provide signal pulses to the input terminals of said semiconductor means to reinitiate oscillation therein, so that the inverter thereafter operates intermittently as required to maintain the capacitor voltage within predetermined voltage limits.

9. Energy conserving power supply apparatus for an electronic photographic flash unit of the type for converting a low voltage battery source to a high voltage for rapidly charging photoflash capacitor means to a predetermined high voltage comprising: a low voltage battery source; semiconductor oscillator means energized from said low voltage battery source, said oscillator means having high voltage output terminals for providing a high voltage alternating output; current rectifying means connecting said oscillator output terminals to said photoflash capacitor means to provide rapid charging of said capacitor means to said predetermined voltage, said capacitor means reflecting to the output terminals of said oscillator means a progressively increasing impedance as the capacitor means voltage nears said predetermined value so that the load current drawn from said oscillator means concurrently decreases in a progressive manner; current responsive feedback means in said semiconductor oscillator means responsive to the output charging current flowing in said oscillator means for providing a feedback for said oscillator means in proportion thereto, said feedback means being designed such that upon said capacitor means being charged to said predetermined voltage the feedback current decreases sufficiently that oscillation ceases; and relaxation oscillator type means energized from said capacitor means connected in starting relation to said semiconductor oscillator means, said relaxation oscillator type means being designed to be responsive only to a voltage less than said predetermined voltage to commence providing signal pulses to said semiconductor oscillator means upon a decrease in said capacitor means voltage to reinitiate oscillation therein, so that upon said photoflash capacitor means being rapidly charged to said predetermined voltage said semiconductor oscillator means is thereafter operated only as required to maintain said capacitor means voltage at or near said predetermined high voltage thereby conserving energy in said battery source.

10. Energy conserving power supply apparatus for converting a low voltage battery source to a high voltage for rapidly charging capacitor means to a predetermined high voltage comprising: a low voltage battery source; semiconductor oscillator means energized from said low voltage battery source, said oscillator means including voltage step-up output transformer means for providing a high voltage alternating output; current rectifying means connecting the transformer means to said capacitor means to provide rapid charging of said capacitor means to said predetermined voltage, said capacitor means reflecting through said transformer means to the output circuit of said oscillator means a progressively increasing impedance as the capacitor means voltage nears said predetermined value so that the load current drawn from said oscillator means concurrently decreases in a progressive manner; current responsive feedback means in said semiconductor oscillator means responsive to the load current flowing in said oscillator means for providing a feedback for said oscillator means in proportion thereto, said feedback means being designed such that upon said capacitor means being charged to said predetermined voltage the feedback current decreases sufficiently that oscillation ceases; and relaxation oscillator type means energized from said capacitor means, said relaxation oscillator type means being designed to be responsive only to a voltage less than said predetermined voltage to thereafter commence providing signal pulses to said semiconductor oscillator means to reinitiate oscillation therein, so that upon said capacitor means being rapidly charged to said predetermined voltage said oscillator means is thereafter operated only as required to maintain said capacitor means voltage at or near said predetermined high voltage thereby conserving energy in said battery source.

References Cited in the file of this patent

UNITED STATES PATENTS

| | | |
|---|---|---|
| 2,748,274 | Pearlman | May 29, 1956 |
| 2,852,730 | Magnuski | Sept. 16, 1958 |
| 2,873,409 | Most | Feb. 10, 1959 |
| 2,877,385 | Rock | Mar. 10, 1959 |
| 2,944,191 | Kapleyn | July 5, 1960 |